United States Patent
Hirotsu et al.

(10) Patent No.: US 9,170,587 B2
(45) Date of Patent: Oct. 27, 2015

(54) CURRENT CONTROL SEMICONDUCTOR ELEMENT AND CONTROL DEVICE USING THE SAME

(75) Inventors: Teppei Hirotsu, Hitachi (JP); Nobuyasu Kanekawa, Hitachi (JP); Itaru Tanabe, Naka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 109 days.

(21) Appl. No.: 13/818,107

(22) PCT Filed: Aug. 1, 2011

(86) PCT No.: PCT/JP2011/067612
§ 371 (c)(1),
(2), (4) Date: Feb. 21, 2013

(87) PCT Pub. No.: WO2012/029485
PCT Pub. Date: Mar. 8, 2012

(65) Prior Publication Data
US 2013/0147453 A1   Jun. 13, 2013

(30) Foreign Application Priority Data

Aug. 31, 2010   (JP) .................................. 2010-193260

(51) Int. Cl.
*G05F 1/46* (2006.01)
*G05F 1/10* (2006.01)
(Continued)

(52) U.S. Cl.
CPC .. *G05F 1/10* (2013.01); *H02P 3/22* (2013.01); *H02P 6/24* (2013.01)

(58) Field of Classification Search
CPC ..... H02M 3/1588; H02M 2/38; H02M 3/156; G05F 1/46

USPC .............. 363/16, 17, 21.01, 21.11, 21.16, 40, 363/56.11, 98; 323/222, 282–290, 276, 323/271–272; 361/62, 78, 152, 154

See application file for complete search history.

(56) References Cited

U.S. PATENT DOCUMENTS 4,761,725 A * 8/1988 Henze .............................. 363/46
7,522,431 B2 * 4/2009 Huynh et al. ............... 363/21.12
(Continued)

FOREIGN PATENT DOCUMENTS

JP   2003-31415 A   1/2003
JP   2003-203805 A   7/2003
(Continued)

OTHER PUBLICATIONS

International Search Report including English translation dated Oct. 18, 2011 (Two (2) pages).

*Primary Examiner* — Rajnikant Patel
(74) *Attorney, Agent, or Firm* — Crowell & Moring LLP (57) ABSTRACT

This invention provides a current control semiconductor element that can detect a current with high accuracy in a single IC chip by dynamically correcting changes in a gain a and an offset b, and a control device that uses the current control semiconductor element,
the current control semiconductor element has a transistor 4, a current-to-voltage conversion circuit 22 and an AD converter 23 on the same semiconductor chip. A reference current generation circuit 6 superimposes a current pulse Ic on a current of a load 2 and changes a voltage digital value to be output from the AD converter. A gain/offset corrector 8 executes signal processing on change in the voltage digital value caused by the reference current generation circuit 6 to dynamically acquire the gain a and the offset b that are used in an equation that indicates a linear relationship between the voltage digital value output from the AD converter 23 and the current digital value of the load. A current digital value calculator 12 uses the gain and the offset acquired by the gain/offset corrector 8 to correct the voltage value output from the AD converter.

6 Claims, 10 Drawing Sheets

(51) Int. Cl.
*H02P 3/22* (2006.01)
*H02P 6/24* (2006.01)

(56) References Cited

U.S. PATENT DOCUMENTS

| | | | |
|---|---|---|---|
| 7,675,757 B2* | 3/2010 | Nakamura | 363/15 |
| 8,179,114 B2* | 5/2012 | Hirahara | 323/285 |
| 8,314,606 B2* | 11/2012 | Sato et al. | 324/123 R |
| 8,421,441 B2* | 4/2013 | Hirotsu et al. | 324/123 R |
| 8,541,993 B2* | 9/2013 | Notman et al. | 323/271 |
| 2011/0101959 A1 | 5/2011 | Hirotsu et al. | |

FOREIGN PATENT DOCUMENTS

| | | |
|---|---|---|
| JP | 2006-165100 A | 6/2006 |
| JP | 2011-97434 A | 5/2011 |

* cited by examiner

CURRENT CONTROL SEMICONDUCTOR ELEMENT AND CONTROL DEVICE USING THE SAME

TECHNICAL FIELD

The present invention relates to a current control semiconductor element and a control device using the current control semiconductor element. The invention more particularly relates to a current control semiconductor element and a control device using the current control semiconductor element which are suitable to incorporate a current detection circuit in an IC chip.

BACKGROUND ART

Electric actuators such as motors and solenoids have been widely used for conversion of electric signals to mechanical motions or hydraulic pressure as various control targets are electrically controlled. It is essential to control a current with high accuracy to sophisticate the electric actuators. In recent years, digital feedback control has been generally used for high-accuracy current control.

To execute digital feedback control of a current, it is necessary to acquire a digital value ioutd of a load current value Iout to be controlled. For this purpose, an output Vout of a current-to-voltage conversion circuit is converted into a digital value by an AD converter. Then, a relative digital value Voutd(=Vout/Vref) with a reference voltage Vref of the AD converter is acquired. Next, the output Voutd of the AD converter is corrected according to input and output characteristics of a current detection circuit that includes the current-to-voltage conversion circuit and the AD converter, thereby acquiring the digital value Ioutd of a current.

Although the current detection circuit has a variety of configurations, it is preferable that the input and output characteristics of the current detection circuit be linear from the perspective of simplifying a control algorithm. In this case, the current digital value Ioutd can be calculated using a gain a and an offset b as expressed by Equation (1).

$$Ioutd = a \cdot Voutd + b \quad (1)$$

When the current value is measured according to Equation (1), it is important how the gain a and the offset b match with actual characteristics of the current detection circuit with high accuracy in improving the accuracy of current measurement.

There is a great need to not only provide the high-accuracy current control but also to downsize a control device and reduce the price. Such need is met by incorporating a current detection circuit in an IC chip. To incorporate the current detection circuit in the IC chip, an IC chip that incorporates a resistor for current detection is known (refer to, for example, Patent Documents 1 and 2).

PRIOR ART DOCUMENT

Patent Document

Patent Document 1: JP-2003-203805-A
Patent Document 2: JP-2006-165100-A

SUMMARY OF THE INVENTION

Problem to be Solved by the Invention

A method of incorporating the resistor for current detection in the IC chip can reduce the number of externally attached parts for current detection, and is therefore good for downsizing the device and reducing the price.

However, a value of the resistor formed in the IC chip changes by several tens of percent due to temperature, and such change appears as a change in the gain a of Equation (1). In addition, a change in the reference voltage Vref of the AD converter used to convert a detected current value into a digital value also causes the gain a to change by a several percent. Furthermore, the offset b of Equation (1) also changes by a several percent due to an input offset of an operational amplifier used in the current detection circuit.

Incorporating the current detection circuit in the IC chip poses a problem that the gain a and offset b of Equation (1) largely change compared with design values and a current detection error increases.

An object of the invention is to provide a current control semiconductor element and a control device using the current control semiconductor element which are capable of detecting a current in a single IC chip with high accuracy by dynamically correcting changes in a gain a and an offset b.

Means for Solving the Problem (1) In order to accomplish the aforementioned object, according to the invention, a current control semiconductor element includes a transistor arranged on a semiconductor chip, for driving a load; a current-to-voltage conversion circuit arranged on the semiconductor chip for converting a current of the load into a voltage; and an AD converter arranged on the semiconductor chip for converting the voltage output from the current-to-voltage conversion circuit into a digital value. The current control semiconductor element comprises; a reference current generator that superimposes a current pulse on the current of the load and changes the voltage digital value to be output from the AD converter; a gain/offset corrector that executes signal processing on change in the voltage digital value caused by the reference current generator to dynamically acquire a gain and an offset that are used in an equation that indicates a linear relationship between the voltage digital value output from the AD converter and the current digital value of the load; and a current digital value calculator that uses the gain and the offset acquired by the gain/offset corrector to correct the voltage value output from the AD converter.

With the aforementioned configuration, the current can be detected with high accuracy in a single IC chip by dynamically correcting changes in the gain a and the offset b.

(2) In Item (1), it is preferable that the current control semiconductor element further include a correcting measured value holder that holds a current value of the current pulse measured from outside with high accuracy, and the gain/offset corrector uses the current value held by the correcting measured value holder and a result of the signal processing of the voltage digital value to dynamically acquire the gain that is used in the equation that indicates a linear relationship between the voltage digital value output from the AD converter and the current digital value of the load.

(3) In Item (2), it is preferable that a current of the current pulse be generated using a resistance and a reference voltage.

(4) In Item (2), it is preferable that a period of the current pulse be an integral multiple of a sampling period of the AD converter.

(5) In Item (2), it is preferable that if the current is controlled by PWM, a period of the current pulse be an integral multiple of a PWM period.

(6) In order to accomplish the aforementioned object, according to the invention, a control device includes a current control semiconductor element; and a microcontroller that controls the current control semiconductor element. The current control semiconductor element includes: a transistor arranged on a semiconductor chip, for driving a load; a current-to-voltage conversion circuit arranged on the semiconductor chip for converting a current of the load into a voltage; an AD converter arranged on the semiconductor chip for converting the voltage output from the current-to-voltage conversion circuit into a digital value; a reference current generator that superimposes a current pulse on the current of the load and changes the voltage digital value to be output from the AD converter; a gain/offset corrector that executes signal processing on change in the voltage digital value caused by the reference current generator to dynamically acquire a gain and an offset that are used in an equation that indicates a linear relationship between the voltage digital value output from the AD converter and the current digital value of the load; and a current digital value calculator that uses the gain and the offset acquired by the gain/offset corrector to correct the voltage value output from the AD converter.

With the aforementioned configuration, the current can be detected with high accuracy in a single IC chip by dynamically correcting changes in the gain a and the offset b, and the accuracy of the control executed by the control device can be improved.

Effect of the Invention

According to the invention, the current can be detected with high accuracy in a single chip IC by dynamically correcting changes in the gain a and the offset b.

MODE FOR CARRYING OUT THE INVENTION

A configuration and operations of a current control semiconductor element according to an embodiment of the invention are described with reference to FIGS. 1 to 5.

First, the configuration of the current control semiconductor element according to the present embodiment is described with reference to FIG. 1.

Figure 1:
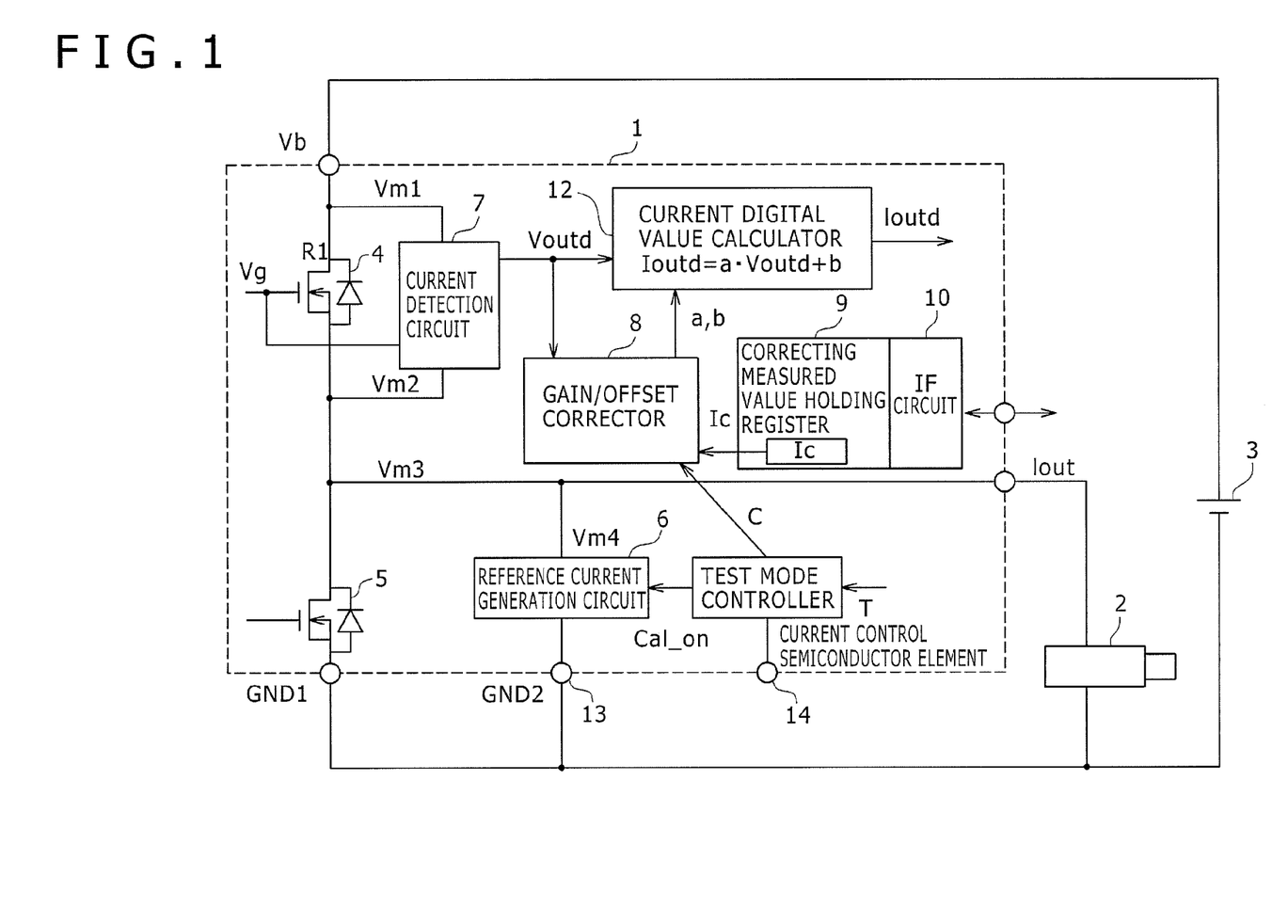
FIG. 1 is a block diagram illustrating a configuration of a current control semiconductor element according to an embodiment of the invention.

FIG. 1 is a block diagram illustrating the configuration of the current control semiconductor element according to the embodiment of the invention.

The current control semiconductor element 1 includes a high-side MOSFET 4, a low-side MOSFET 5, a reference current generation circuit 6, a current detection circuit 7, a gain/offset corrector 8, a correcting measured value holding register 9, an IF circuit 10 and a test mode controller 11.

The current control semiconductor element 1 is connected to a solenoid 2 and a battery 3 which supplies a voltage to the solenoid 2. The current control semiconductor element 1 turns on/off a voltage to be supplied to the solenoid 2 by pulse width modulation (PWM), thereby controlling a current flowing in the solenoid 2 and driving the solenoid 5.

The high-side MOSFET 4 is a switch arranged between the solenoid 2 and the battery 3. The high-side MOSFET 4 is in an ON state when a gate signal Vg for the high-side MOSFET 4 is at a high level, and is in an OFF state when the gate signal Vg for the high-side MOSFET 4 is at a low level. The current flowing in the solenoid 2 increases when the high-side MOSFET 4 is in the ON state and the low-side MOSFET 5 is in an OFF state, and decreases when the high-side MOSFET 4 is in the OFF state.

The low-side MOSFET 5 is in an ON state during a period when the high-side MOSFET 4 is in the OFF state. When the high-side MOSFET 4 is in the OFF state, the low-side MOSFET 5 is used as a path for returning the current flowing in the solenoid 2.

The current detection circuit 7 is connected to the high-side MOSFET 4 in parallel, and converts a current flowing in the high-side MOSFET 4, that is, the current flowing in the solenoid 2 into a voltage. Then, the current detection circuit 7 outputs a digital value Voutd of the voltage. The current detection circuit 7 incorporates an AD converter.

The reference current generation circuit 6 generates a reference current used to correct the gain a and offset b of the aforementioned Equation (1) that indicates the relationship between the digital value of the current flowing in the solenoid 2 and the voltage digital value output from the current detection circuit 7.

For the gain/offset corrector 8 to correct the gain a and the offset b, the correcting measured value holding register 9 holds a current value Ic of a current pulse that is generated by the reference current generation circuit 6.

The gain/offset corrector 8 corrects the gain a and the offset b on the basis of the output Voutd of the current detection circuit 7 and the current value held by the correcting measured value holding register 9, and outputs the corrected values to a current digital value calculator 12.

The current digital value calculator 12 outputs a digital value Ioutd of the current on the basis of the digital value Voutd received from the current detection circuit 7, the gain a and the offset b that are received from the gain/offset corrector 8 according to Equation (1).

The IF circuit 10 provides an interface function of reading and writing the value Ic held by the correcting measured value holding register 9 from and in a device arranged outside the current control semiconductor element 1.

The test mode controller 11 is activated by an external device through a terminal 14. When the test mode controller 11 is activated, it uses a control signal Cal_on to control the reference current generation circuit 6 and outputs to a terminal 13 a current flowing in the reference current generation circuit 6. Thus, a value of the current flowing in the reference current generation circuit 6 can be measured from the outside of the current control semiconductor element 1. The measured current value Ic is held in the correcting measured value holding register 9 through the IF circuit 10. The activation of test mode controller 11 by the external device through the terminal 14 is performed before shipment of the current control semiconductor element 1.

In addition, the test mode controller 11 outputs a correction command C on the basis of information of a temperature T of the inside of the current control semiconductor element 1, and activates the gain/offset corrector 8. The gain/offset corrector 8 corrects the gain a and the offset b on the basis of the output Voutd of the current detection circuit 7 and the current value held by the correcting measured value holding register 9, and outputs the corrected gain a and the corrected offset b to the current digital value calculator 12. Specifically, when the current temperature is changed by a predetermined temperature or more from a temperature when the gain a and the offset b are previously corrected, the test mode controller 11 activates the gain/offset corrector 8, corrects the gain a and the offset b, and outputs the corrected values to the current digital value calculator 12. The internal temperature T of the current control semiconductor element 1 is measured using temperature dependence of a value of a resistor formed in the current control semiconductor element 1.

Next, the configuration of the current detection circuit 7 used in the current control semiconductor element 1 according to the present embodiment is described with reference to FIG. 2.

Figure 2:
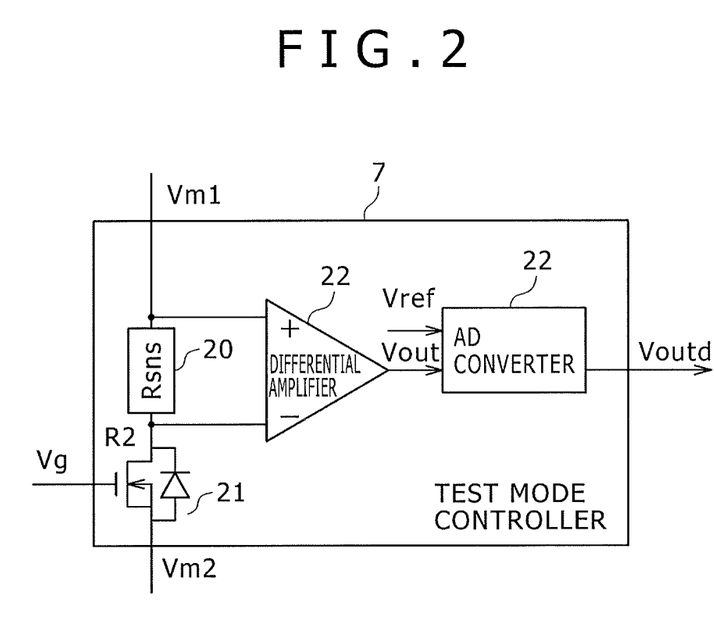
FIG. 2 is a block diagram illustrating a configuration of a current detection circuit that is used in the current control semiconductor element according to the embodiment of the invention.

FIG. 2 is a block diagram illustrating the configuration of the current detection circuit 7 used in the current control semiconductor element 1 according to the embodiment of the invention.

The current detection circuit 7 has a sense MOSFET 21 which is in the ON state when the gate signal Vg is at the high level, that is, when the high-side MOSFET 4 is in the ON state. The sense MOSFET 21 is controlled to flow to a sense resistor (Rsns) 20 a current shunted on the basis of a shunt ratio determined by an ON resistance ratio of the high-side MOSFET 4 and the sense MOSFET 21. A differential amplifier 22 amplifies the difference between potentials of both ends of the sense resistor (Rsns) 20 and outputs a voltage value Vout. The AD converter 23 converts the voltage value Vout output from the differential amplifier 22 into a digital value at a sampling period Ts and outputs the relative digital value Voutd(=Vout/Vref) to the reference voltage Vref.

Since characteristics of the current detection circuit 7 described above are linear, the relationship between the digital value Ioutd of the current and the output Voutd of the current detection circuit 7 can be represented by Equation (1) using the gain a and the offset b.

Next, the configuration of the reference current generation circuit 6 used in the current control semiconductor element according to the present embodiment is described with reference to FIG. 3.

Figure 3:
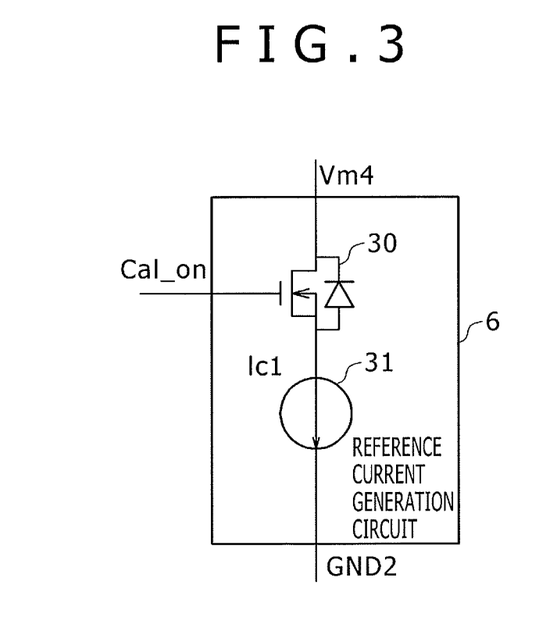
FIG. 3 is a block diagram illustrating a configuration of a reference current generation circuit that is used in the current control semiconductor element according to the embodiment of the invention.

FIG. 3 is a block diagram illustrating the configuration of the reference current generation circuit used in the current control semiconductor element according to the embodiment of the invention.

The reference current generation circuit 6 has a MOSFET 30. When the gate signal Cal_on is at the high level, the MOSFET 30 is controlled to flow a current (of a current value Ic) of a constant current source 31.

Next, a method for correcting the gain a and the offset b by the current control semiconductor element according to the present embodiment is described with reference to FIG. 4.

Figure 4:
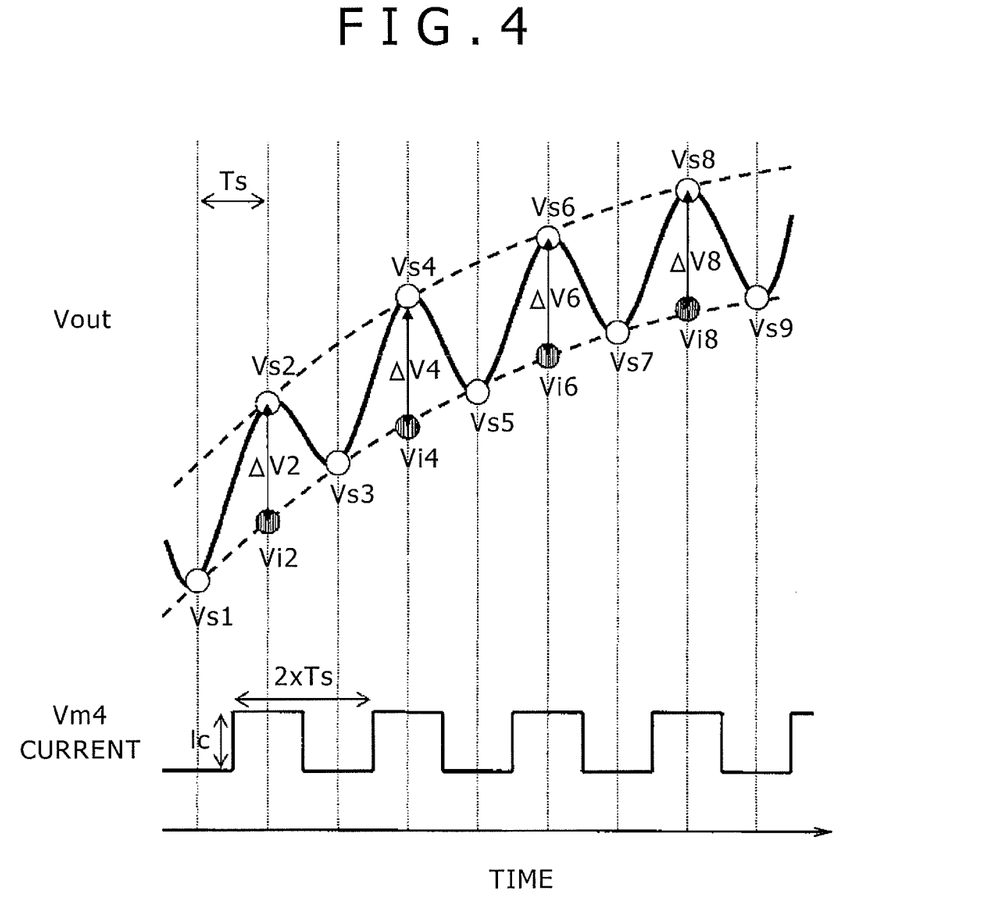
FIG. 4 is an explanatory diagram showing a method for correcting a gain and an offset by the current control semiconductor element according to the embodiment of the invention.

FIG. 4 is an explanatory diagram showing the method for correcting the gain a and the offset b by the current control semiconductor element according to the embodiment of the invention.

To correct the gain a, the reference current generation circuit 6 superimposes on a solenoid current a current pulse having an amplitude Ic and a period of (2·Ts) which is twice as long as the sampling period of the AD converter 23, thereby changing the output Vout of the differential amplifier 22.

In an example illustrated in FIG. 4, a series of the relative digital values Voutd output from the AD converter 23 is voltages Vs1, Vs2, . . . , Vs9. Among these voltages, the voltages Vs2, Vs4, . . . , Vs8 indicated using even indexes are digital values sampled when the current pulse of the amplitude Ic is applied by the reference current generation circuit 6.

Midpoint voltages Vi2=Vs1+Vs3/2, Vi4=Vs3+Vs5/2, . . . , Vi8=Vs7+Vs9/2 are calculated on the basis of a series of the digital values indicated using odd indexes. Then, by calculating the differences between the calculated midpoint voltages and the corresponding voltages Vs2, Vs4, . . . , Vs8 indicated using the even indexes, differential voltages ΔV2, ΔV4, . . . , ΔV8 are acquired. The differential voltages ΔV2, ΔV4, . . . , ΔV8 calculated in the aforementioned manner are digital values of changes in the digital values Vout, the changes being caused by applying the current pulse of the amplitude Ic to the solenoid current by the reference current generation circuit 6.

To suppress an influence of the application of the reference current on the solenoid current, the amplitude Ic of the current pulse generated by the reference current generation circuit 6 is limited to a value that is smaller than the solenoid current value. As a result, quantization errors of the differential voltages ΔV2, ΔV4, . . . , ΔV8 are large. However, the quantization errors can be reduced by calculating the average aveΔV. By using the obtained average aveΔV and the amplitude Ic, the gain a of Equation (1) can be calculated with high accuracy according to the following Equation (2).

$$a = Ic/ave\Delta V \qquad (2)$$

If the output of the current detection circuit 7 is defined as an off voltage Voutd_off when the high-side MOSFET 4 is in the OFF state, that is, when the current value is "0", the offset b can be calculated from Equations (1) and (2) according to the following Equation (3).

$$b = -a \cdot Voutd\_off \qquad (3)$$

Here, the current value Ic of the constant current source 31 is measured using the test mode controller 11 from the outside with high accuracy and stored in a nonvolatile memory or the like in advance. When the current control semiconductor element 1 is activated, the current value Ic is transferred to the correcting measured value holding register 9 through the IF circuit 10.

Thus, the gain/offset corrector 8 measures the changes in the relative digital values Voutd at an arbitrary timing when the correction is necessary (when the internal temperature of the current control semiconductor element 1 is changed by the predetermined temperature or more). Then, the gain a and the offset b can be calculated according to Equations (2) and (3) using the value Ic stored in the correcting measured value holding register 9.

Errors of the correction of the gain a and offset b by the gain/offset corrector 8 as described above depend on an absolute error of the current value Ic of the constant current source 31. However, the current value of the constant current source does not depend on a power source and a temperature, and a change in the current value of the constant current source can be close to 0 in principle. Thus, the gain a and the offset b can be corrected with high accuracy.

In the present embodiment, the gain a and the offset b can be corrected with high accuracy and the current can be measured with high accuracy.

In the above description, the reference current generation circuit 6 superimposes on the solenoid current the current pulse having a period of (2·Ts) which is twice as long as the sampling period of the AD converter 23. However, the reference current generation circuit 6 may superimpose on the solenoid current a current pulse having a period which is another integral multiple of, for example, three or four times as long as the sampling period of the AD converter 23. For example, the sampling period Ts of the AD converter 23 is approximately 10 μs. Further, if the reference current Ic to be superimposed abruptly rises, the increases caused by the reference current Ic can be accurately detected by calculating the differential voltages ΔV using the principle described with reference to FIG. 4. However, if the reference current Ic to be superimposed slowly rises, the differential voltages ΔV may not accurately indicate the increases caused by the reference current Ic. In this case, the increases caused by the reference current Ic can be accurately detected by superimposing on the solenoid current the current pulse having a period which is an integral multiple of, for example, is three or four times as long as the sampling period of the AD converter 23.

Next, another method for correcting the gain a and the offset b by the current control semiconductor element according to the present embodiment is described with reference to FIG. 5.

Figure 5:
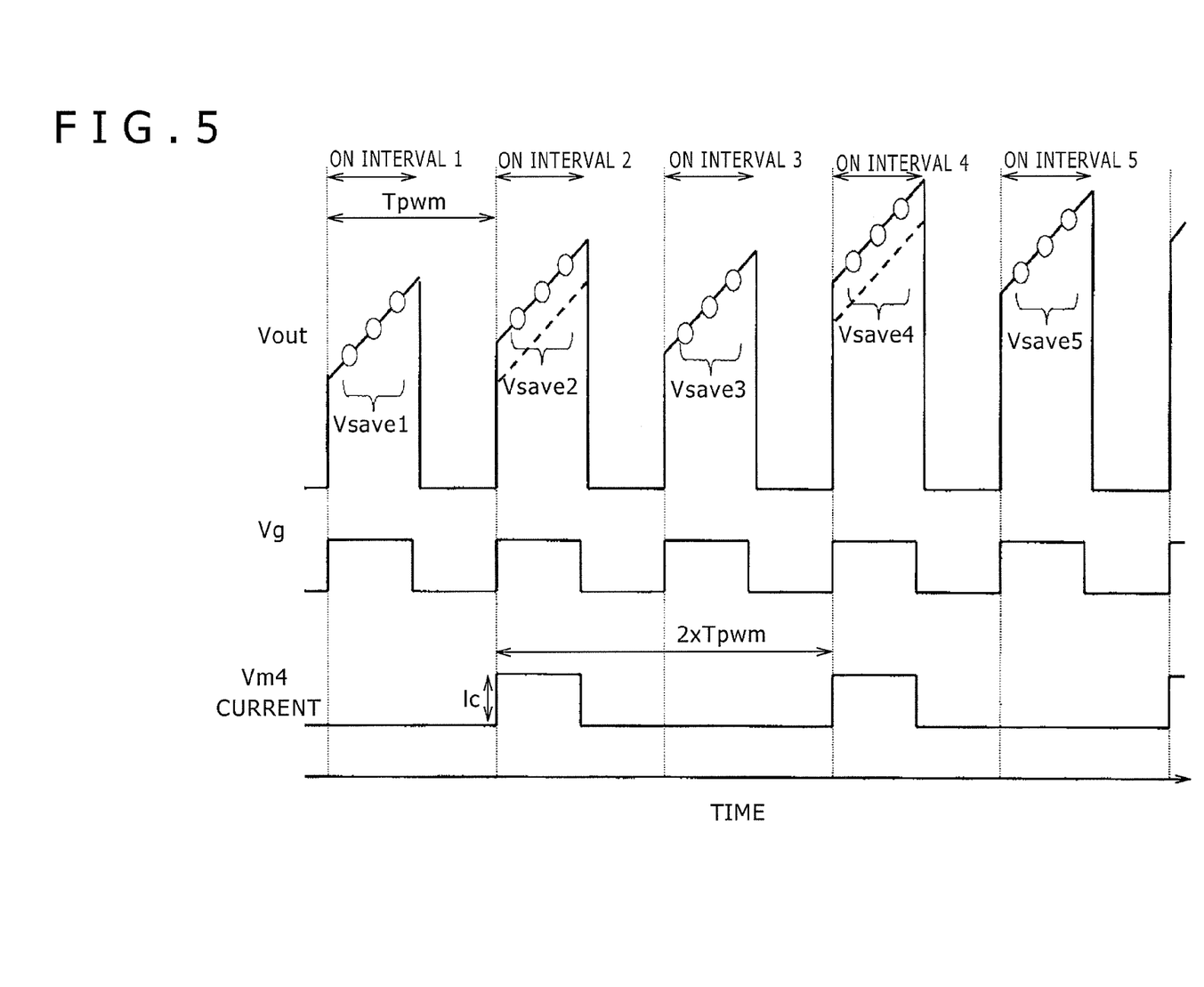
FIG. 5 is an explanatory diagram showing another method for correcting the gain and the offset by the current control semiconductor element according to the embodiment of the invention.

FIG. 5 is an explanatory diagram showing the other method for correcting the gain a and the offset b by the current control semiconductor element according to the embodiment of the invention.

Here, a ΔΣ modulation type AD converter is used as the AD converter 23 illustrated in FIG. 2.

To correct the gain a, the reference current generation circuit 6 superimposes on the solenoid current a current pulse having the amplitude Ic and period which is twice as long as a PWM period. Then, the reference current generation circuit 6 causes the output Vout of the differential amplifier 22 to change for each PWM period. In an example illustrated in FIG. 5, the reference current generation circuit 6 applies the current pulse of the amplitude Ic for ON intervals 2 and 4.

A series of the averages Vsave1, Vsave2, . . . , Vsave5 of values Voutd for ON intervals of the PWM is acquired. Among the averages, a series of the averages Vsave2 and Vsave4 of the values outd is the averages of the relative digital values Voutd for the ON intervals of the PWM in which the current pulse of the amplitude Ic is applied by the reference current generation circuit 6.

Here, a midpoint Viave2=Vsave1+Vsave3/2 and a midpoint Viave4=Vsave3+Vsave5/2 are calculated using a series of the averages (indicated using the odd indexes) of the values Voutd. In addition, the difference ΔVave2=Vsave2−Viave2 between the average Vsave2 indicated using the even index and the midpoint Viave2 and the difference ΔVave4=Vsave4−Viave4 between the average Vsave4 indicated using the even index and the midpoint Viave4 are acquired. The differences ΔVave2 and ΔVave4 calculated in the aforementioned manner are the averages of the changes in the values Voutd, the changes in the values Voutd being caused by adding the current pulse of the amplitude Ic to the solenoid current by the reference current generation circuit 6.

In a similar manner to FIG. 5, to suppress an influence of the application of the reference current on the solenoid current, the amplitude Ic of the current pulse generated by the reference current generation circuit 6 is limited to a value that is smaller than the solenoid current value. As a result, quantization errors of the differences ΔVave2 and ΔVave4 are large. However, the quantization errors can be reduced by calculating the average aveΔVave of the differences. By using the calculated average aveΔVave and the amplitude Ic, the gain a of Equation (1) can be calculated with high accuracy according to the following Equation (4).

$$a = Ic/\text{ave}\Delta Vn \quad (4)$$

In a similar manner to FIG. 4, the offset b can be calculated using Equations (1) and (4) on the basis of output Voutd_off of the current detection circuit 7 when the high-side MOSFET 4 is in the OFF state.

Even when the ΔΣ modulation type AD converter for which it is difficult to sample a peak value in principle is used, the gain a and the offset b can be calculated with high accuracy in the aforementioned method. Since the ΔΣ modulation type AD converter enables the circuit to be downsized, the cost of the current control semiconductor element according to the present embodiment can be reduced.

As described above, according to the present embodiment, the voltage digital value to be output from the AD converter can be changed by superimposing the current pulse on the current of the load, and the gain of the equation that indicates a linear relationship between the voltage digital value output from the AD converter and the current digital value of the load can be dynamically acquired by executing signal processing of a change in the voltage digital value. Since the gain can be corrected at an arbitrary timing, the accuracy of current detection can be improved by increasing the frequency of the correction.

Next, a configuration and operations of a current control semiconductor element according to another embodiment of the invention are described with reference to FIGS. 6 and 7.

Figure 6:
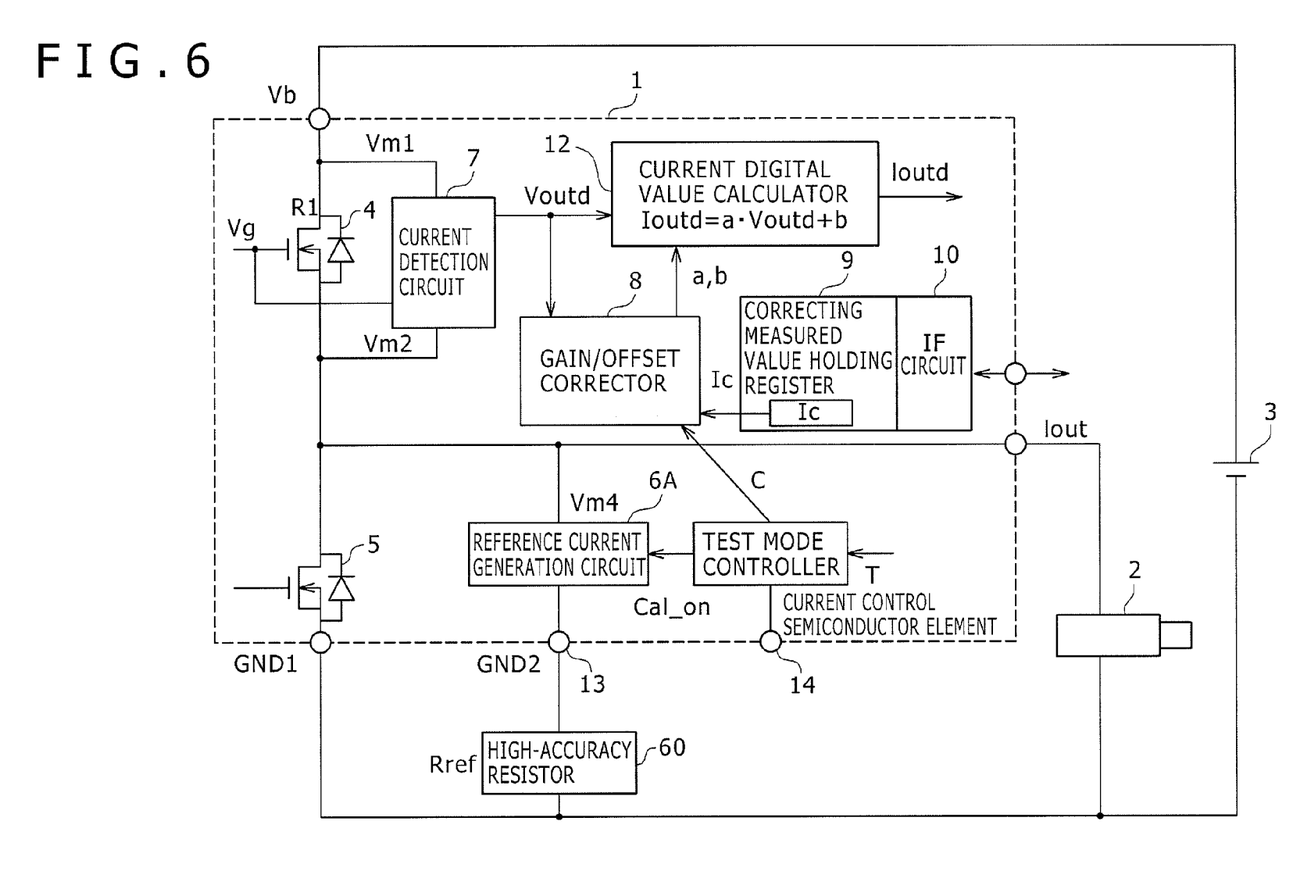
FIG. 6 is a block diagram illustrating a configuration of a current control semiconductor element according to another embodiment of the invention.

FIG. 6 is a block diagram illustrating the configuration of the current control semiconductor element according to the other embodiment of the invention. In FIG. 6, reference numerals and symbols that are the same as those illustrated in FIG. 1 indicate the same parts as those illustrated in FIG. 1. FIG. 7 is a block diagram illustrating the configuration of a reference current generation circuit that is used in the current control semiconductor element according to the other embodiment of the invention.

Referring to FIG. 6, in the present embodiment, a reference current generation circuit 6A and a high-accuracy externally attached resistor 60 with a resistance Rref are mounted instead of the reference current generation circuit 6 described with reference to FIGS. 1 and 3.

Figure 7:
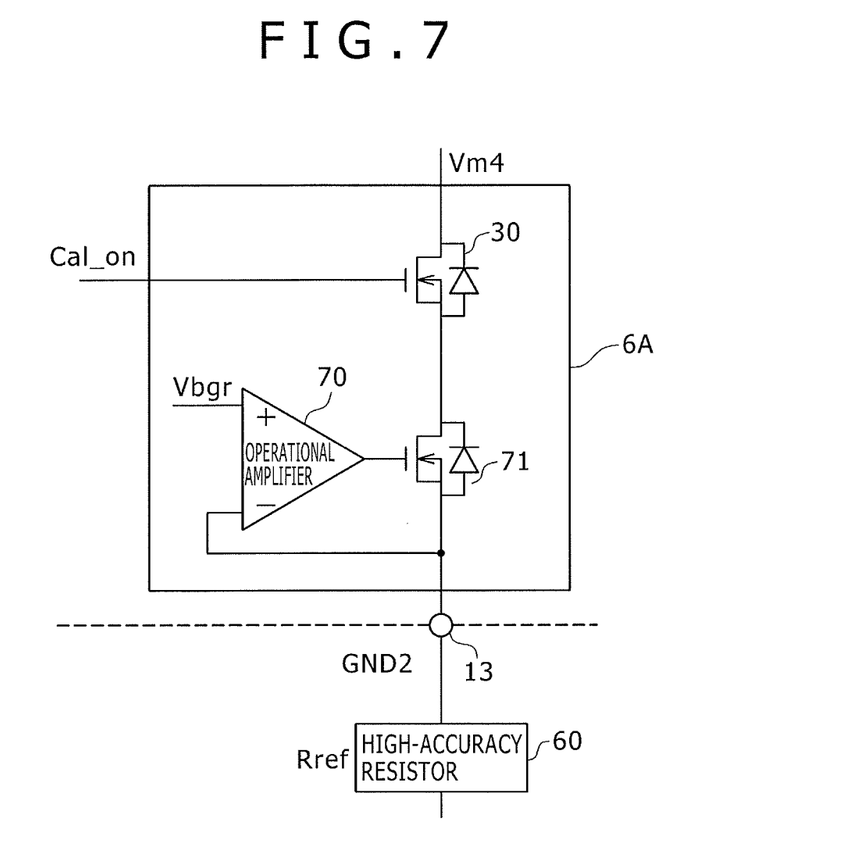
FIG. 7 is a block diagram illustrating a configuration of a reference current generation circuit that is used in the current control semiconductor element according to the other embodiment of the invention.

As illustrated in FIG. 7, the reference current generation circuit 6A has a MOSFET 30 which is in an ON state when the gate signal Cal_on is at the high level. An operational amplifier 70 controls a gate voltage of a MOSFET 71 so that a voltage of a ground terminal GND2 is equal to a reference voltage Vbgr input to a positive terminal of the operational amplifier. As a result, current of a value Ic=Vbgr/Rref flows.

In the present embodiment, at the time of acquiring the reference current Ic, it is sufficient if, rather than a value of a minute current flowing in the ground terminal GND2, a value of the reference voltage Vbgr, specifically, a voltage value of approximately 1.2 V is measured when the reference voltage Vbgr is generated by a band gap regulator. Thus, a measuring device that is required to acquire the reference current Ic can be simplified, and the measurement accuracy can be improved.

As described above, according to the present embodiment, the voltage digital value to be output from the AD converter can be changed by superimposing the current pulse on the current of the load, and the gain of the equation that indicates a linear relationship between the voltage digital value output from the AD converter and the digital value of the current of the load can be dynamically acquired. Since the gain can be corrected at an arbitrary timing, the accuracy of current detection can be improved by increasing the frequency of the correction.

In addition, since the current value of the constant current source is corrected using a value accurately measured from the outside in advance, the accuracy of the correction can be improved.

Next, a configuration and operations of an automatic transmission control device that uses current control semiconductor elements according to any of the embodiments of the invention are described with reference to FIG. 8.

Figure 8:
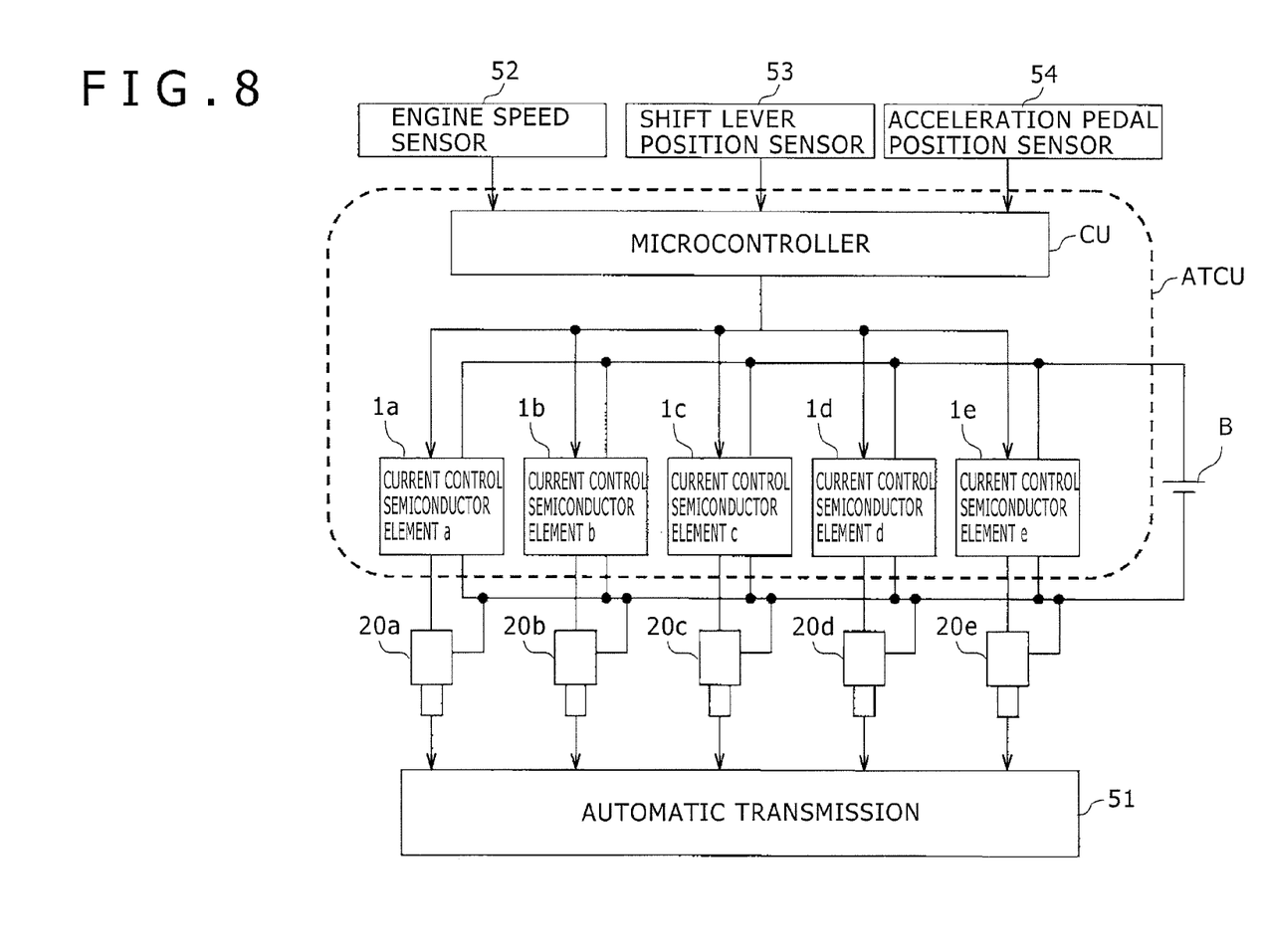
FIG. 8 is a block diagram illustrating a configuration of an automatic transmission control device that uses current control semiconductor elements according to any of the embodiments of the invention.

FIG. 8 is a block diagram illustrating the configuration of the automatic transmission control device that uses current control semiconductor elements according to any of the embodiments of the invention. In FIG. 8, reference numerals and symbols that are the same as those illustrated in FIG. 1 indicate the same parts as those illustrated in FIG. 1.

The automatic transmission control device ATCU includes a microcontroller CU that is the upstream-side control device illustrated in FIG. 1, and a plurality of current control semiconductor elements $1a, \ldots, 1e$, each of which corresponds to the current control semiconductor element 1.

The microcontroller 1 receives sensor values from an engine speed sensor 52, a shift lever position sensor 53 and an acceleration pedal position sensor 54, and calculates the optimal transmission gear ratio from the received sensor values. To achieve such an optimal transmission gear ratio, the microcontroller 1 calculates command values for hydraulic pressure of a plurality of clutches (not illustrated) included in a transmission 51 and command values for current values of solenoids $20a, \ldots, 20e$ which correspond to the hydraulic pressure. Then, the microcontroller 1 outputs the command values $Ia^*, \ldots, Ie^*$ for the current values to the current control semiconductor elements $1a, \ldots, 1e$.

As described above in the embodiments, the accuracy of current detection can be improved by the current control semiconductor elements $1a, \ldots, 1e$. Thus, a speed of a vehicle can be smoothly changed and a ride quality of the vehicle can be improved.

In FIG. 8, the microcontroller CU receives the sensor values from the engine speed sensor 52, the shift lever position sensor 53 and the acceleration pedal position sensor 54. The number and types of sensors from which the microcontroller CU receives sensor values, however, may be changed on the basis of a transmission control method. Although the microcontroller CU directly receives the sensor values from the sensors in FIG. 8, the microcontroller CU may receive the sensor values through another microcontroller or an IC. Further, FIG. 8 illustrates an example in which the automatic transmission 51 has the five clutches. However, the number of clutches and that of solenoid current control devices that correspond to the clutches may be changed on the basis of a transmission mechanism.

Next, a configuration and operations of a brake control device that uses a current control semiconductor element according to any of the embodiments of the invention are described with reference to FIG. 9.

Figure 9:
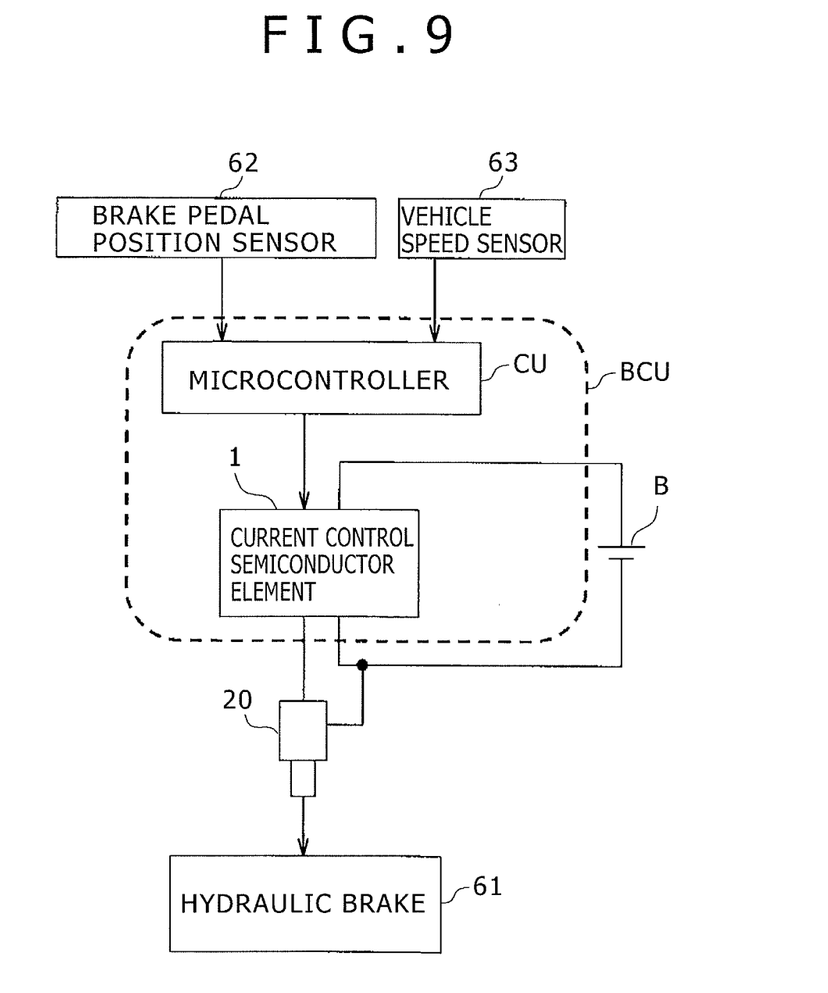
FIG. 9 is a block diagram illustrating a configuration of a brake control device that uses a current control semiconductor element according to any of the embodiments of the invention.

FIG. 9 is a block diagram illustrating the configuration of the brake control device using a current control semiconductor element according to any of the embodiments of the invention. In FIG. 9, reference numerals and symbols that are the same as those illustrated in FIG. 1 indicate the same parts as those illustrated in FIG. 1.

The brake control device BCU includes the microcontroller CU illustrated in FIG. 1 and the current control semiconductor element 1.

The microcontroller CU receives sensor values from a brake pedal position sensor 63 and a vehicle speed sensor 64, and calculates the optimal brake force from the received sensor values. To achieve such braking force, the microcontroller CU calculates a command value for hydraulic pressure of a hydraulic brake 61 and a command value for a current value of a solenoid 20 which corresponds to the hydraulic pressure. Then, the microcontroller CU outputs the command value $I^*$ for the current value to the current control semiconductor element 1.

As described above in the embodiments, the current control semiconductor element 1 can improve the accuracy of current detection. Thus, smooth braking can be achieved and a ride quality of a vehicle can be improved.

It is noted that in FIG. 9, the microcontroller CU receives the sensor values from the brake pedal position sensor 63 and the vehicle speed sensor 64. However, the number and types of sensors from which the microcontroller CU receives sensor values may be changed on the basis of a braking method. In addition, although the microcontroller CU directly receives the sensor values from the sensors in FIG. 9, the microcontroller CU may receive the sensor values through another microcontroller or an IC.

Next, a configuration and operations of a brushless motor control device that uses current control semiconductor elements according to any of the embodiments of the invention are described with reference to FIG. 10.

Figure 10:
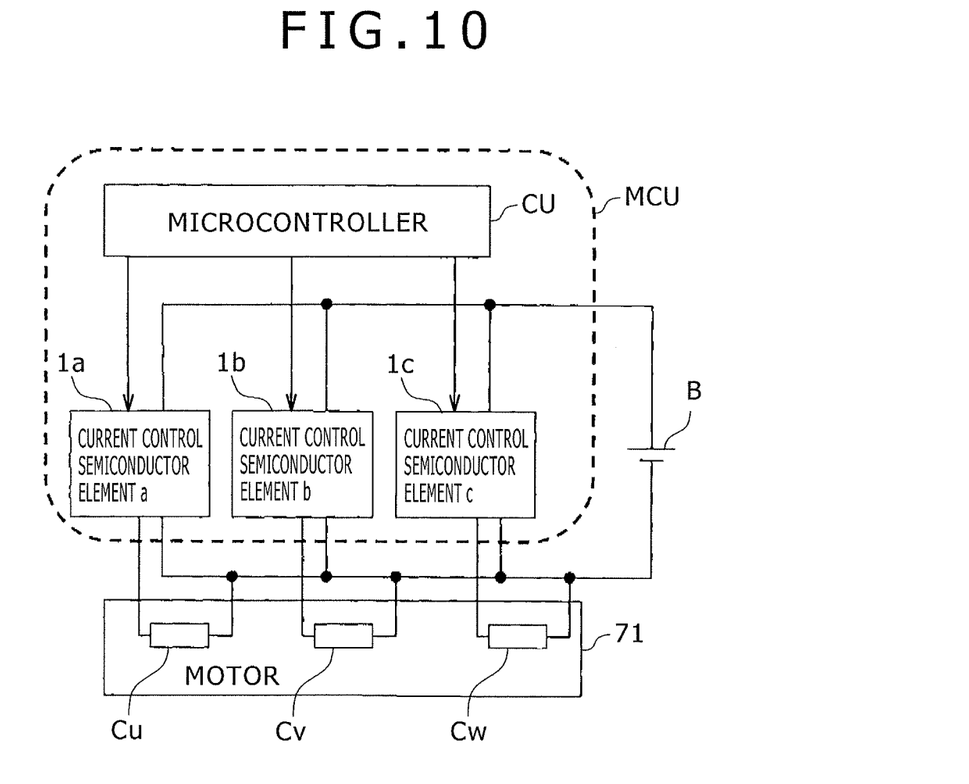
FIG. 10 is a block diagram illustrating a brushless motor control device that uses current control semiconductor elements according to any of the embodiments of the invention.

FIG. 10 is a block diagram illustrating the configuration of the brushless motor control device using current control semiconductor elements according to any of the embodiments of the invention. In FIG. 9, reference symbols that are the same as those illustrated in FIG. 1 indicate the same parts as those illustrated in FIG. 1.

The brushless motor control device MCU includes the microcontroller CU illustrated in FIG. 1 and the current control semiconductor elements 1.

The microcontroller CU calculates a target rotational speed of a motor and three-phase three command values for three phase coils Cu, Cv and Cw of the motor 71 to achieve torque. Then, the microcontroller CU outputs the three-phase current command values $Iu^*$, $Iv^*$ and $Iw^*$ to the current control semiconductor elements $1a, \ldots, 1c$.

As described above in the embodiments, the current control semiconductor elements 1a, . . . , 1c can improve the accuracy of current detection. Thus, the motor can be smoothly controlled.

As described above, in the present embodiment, the voltage digital value to be output from the AD converter can be changed by superimposing the current pulse on the current of the load, and the gain of the equation that indicates a linear relationship between the voltage digital value output from the AD converter and the current digital value of the load can be dynamically acquired by executing signal processing on a change in the voltage digital value. The gain can be corrected at an arbitrary timing. Thus, the accuracy of current detection can be improved by increasing the frequency of the correction. That is, the current can be detected with high accuracy in a single IC chip by dynamically correcting the changes in the gain a and the offset b.

In addition, since the current value of the constant current source is corrected using a value accurately measured from the outside in advance, the accuracy of the correction can be improved.

Next, a configuration and operations of a current control semiconductor element according to another embodiment of the invention are described with reference to FIG. 11.

Figure 11:
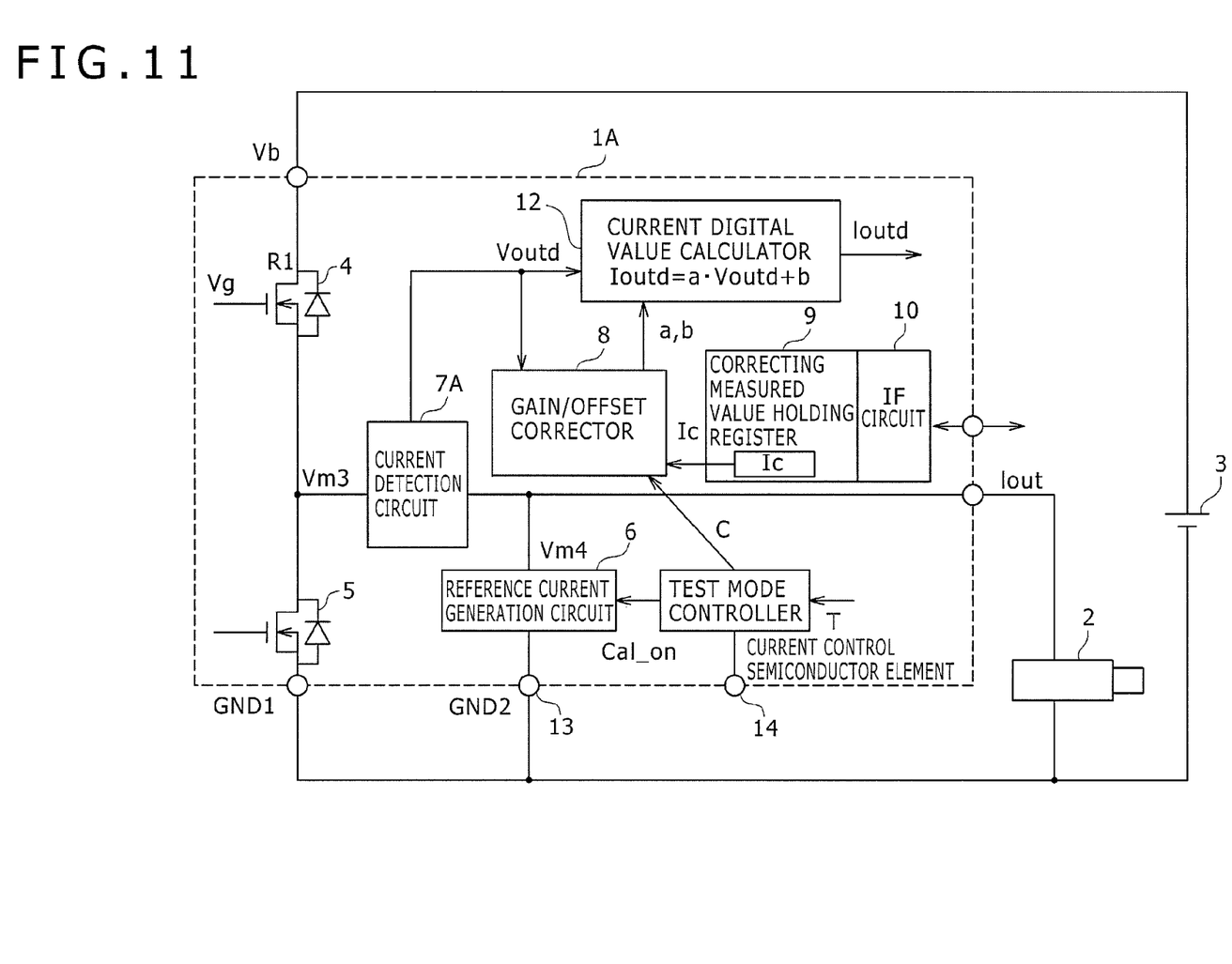
FIG. 11 is a block diagram illustrating a configuration of a current control semiconductor element according to another embodiment of the invention.

FIG. 11 is a block diagram illustrating the configuration of the current control semiconductor element according to the other embodiment of the invention. In FIG. 11, reference numerals and symbols that are the same as those illustrated in FIG. 1 indicate the same parts as those illustrated in FIG. 1.

The current control semiconductor element 1A has a current detection circuit 7A instead of the current detection circuit 7 illustrated in FIG. 1. The current detection circuit 7A includes a shunt resistor. The current detection circuit 7A is connected in series to a terminal Iout and converts a current flowing in the solenoid 2 into a voltage using the shunt resistor included in the current detection circuit 7A. Then, the current detection circuit 7A outputs a digital value Voutd of the converted voltage. Like the embodiment illustrated in FIG. 1, characteristics of the current detection circuit 7A are linear. Thus, the relationship between the digital value Ioutd of the current and the output Voutd of the current detection circuit 7A can be represented by the aforementioned Equation (1) using the gain a and the offset b.

As illustrated in FIGS. 4 and 5, therefore, the gain a can be corrected with high accuracy using the voltage value Vout obtained by applying the current pulse. In addition, with regard to the offset b, an offset value thereof can be acquired and corrected by short-circuiting an input of the AD converter for a certain interval.

Thus, it is possible to correct the gain a and the offset b with high accuracy and measure the current with high accuracy even in the present embodiment.

Further in the present embodiment, since the total current of the solenoid 2 is measured, it is possible to simplify a calculation of the average current of the solenoid 2 and reduce the area of a logic part of the current control semiconductor element 1A.

DESCRIPTION OF REFERENCE NUMERALS

1 . . . Current control semiconductor element
2 . . . Solenoid
3 . . . Battery
4 . . . High-side MOSFET
5 . . . Low-side MOSFET
6, 6A . . . Reference current generation circuit
8 . . . Current detection circuit
9 . . . Correcting measured value holding register
10 . . . IF circuit
11 . . . Test mode controller
12 . . . Current digital value calculator

The invention claimed is:

1. A current control semiconductor element comprising:
a transistor arranged on a semiconductor chip, for driving a load,
a current-to-voltage conversion circuit arranged on the semiconductor chip for converting a current of the load into a voltage, wherein the current of the load is controlled using a feedback control,
an AD converter arranged on the semiconductor chip for converting the voltage output from the current-to-voltage conversion circuit into a digital value,
wherein the current control semiconductor element comprises:
a reference current generator that superimposes a current pulse on the current of the load when the load is applied with the current by the feedback control and changes the voltage digital value to be output from the AD converter;
a gain/offset corrector that executes signal processing on change in the voltage digital value caused by the reference current generator to dynamically acquire a gain and an offset that are used in an equation that indicates a linear relationship between the voltage digital value output from the AD converter and the current digital value of the load, wherein the equation is Ioutd=a·Voutd+b, Ioutd is the current digital value of the load, a is the gain, Voutd is the voltage digital value output from the AD converter, and b is the offset; and
a current digital value calculator that uses the gain and the offset acquired by the gain/offset corrector to correct the voltage value output from the AD converter.

2. The current control semiconductor element according to claim 1, further comprising;
a correcting measured value holder that holds a current value of the current pulse measured from outside with high accuracy,
wherein the gain/offset corrector uses the current value held by the correcting measured value holder and a result of the signal processing on the voltage digital value to dynamically acquire the gain that is used in the equation that indicates the linear relationship between the voltage digital value output from the AD converter and the current digital value of the load.

3. The current control semiconductor element according to claim 2,
wherein a current of the current pulse is generated using a resistance and a reference voltage.

4. The current control semiconductor element according to claim 2,
wherein a period of the current pulse is an integral multiple of a sampling period of the AD converter.

5. The current control semiconductor element according to claim 2,
wherein if the current is controlled by PWM, a period of the current pulse is an integral multiple of a PWM period.

6. A control device comprising:
a current control semiconductor element; and
a microcontroller that controls the current control semiconductor element,
wherein the current control semiconductor element includes
a transistor arranged on a semiconductor chip, for driving a load, a current-to-voltage conversion circuit arranged on the semiconductor chip for converting a current of the load into a voltage, wherein the current of the load is controlled using a feedback control, an AD converter arranged on the semiconductor chip for converting the voltage output from the current-to-voltage conversion circuit into a digital value, a reference current generator that superimposes a current pulse on the current of the load when the load is applied with the current by the feedback control and changes the voltage digital value to be output from the AD converter, a gain/offset corrector that executes signal processing on change in the voltage digital value caused by the reference current generator to dynamically acquire a gain and an offset that are used in an equation that indicates a linear relationship between the voltage digital value output from the AD converter and the current digital value of the load, wherein the equation is $Ioutd = a \cdot Voutd + b$, Ioutd is the current digital value of the load, a is the gain, Voutd is the voltage digital value output from the AD converter, and b is the offset, and a current digital value calculator that uses the gain and the offset acquired by the gain/offset corrector to correct the voltage value output from the AD converter.

* * * * *